United States Patent
Herchl et al.

(10) Patent No.: US 12,320,070 B2
(45) Date of Patent: Jun. 3, 2025

(54) METHOD FOR PRODUCING A CELLULOSE PAPER MATERIAL FROM USED TEXTILES

(71) Applicant: LENZING AKTIENGESELLSCHAFT, Lenzing (AT)

(72) Inventors: Richard Herchl, Ried im Innkreis (AT); Christian Weilach, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 449 days.

(21) Appl. No.: 17/596,094

(22) PCT Filed: May 29, 2020

(86) PCT No.: PCT/EP2020/065036
§ 371 (c)(1),
(2) Date: Dec. 2, 2021

(87) PCT Pub. No.: WO2020/245053
PCT Pub. Date: Dec. 10, 2020

(65) Prior Publication Data
US 2022/0235519 A1  Jul. 28, 2022

(30) Foreign Application Priority Data
Jun. 4, 2019 (EP) .................................... 19178178

(51) Int. Cl.
*D21H 13/20* (2006.01)
*D21C 5/00* (2006.01)

(52) U.S. Cl.
CPC ............... *D21H 13/20* (2013.01); *D21C 5/00* (2013.01)

(58) Field of Classification Search
CPC ........ D21H 13/20; D21H 13/12; D21H 11/14; D21C 5/00; Y02W 30/64; Y02W 30/66; D01G 11/00; D21B 1/028; D21B 1/10
See application file for complete search history.

(56) References Cited

U.S. PATENT DOCUMENTS 4,983,256 A * 1/1991 Combette ................ D21C 9/00
                                                             162/25
6,528,163 B2   3/2003 Sealey et al.
(Continued)

FOREIGN PATENT DOCUMENTS

CN       150 57 03 A    6/2004
CN       103 147 337 A  6/2013
(Continued)

OTHER PUBLICATIONS

Chinese Office action for Application No. 202080039797.X, dated Jun. 26, 2024, 26 pages.
(Continued)

*Primary Examiner* — Dennis R Cordray
*Assistant Examiner* — Matthew M Eslami
(74) *Attorney, Agent, or Firm* — Womble Bond Dickinson (US) LLP

(57) ABSTRACT

A method for manufacturing a cellulosic paper material (150) is described. The method comprises: i) providing (105) used textiles as starting material (101), wherein the used textiles comprise cellulose and non-cellulosic foreign matters (in particular synthetic plastics and/or metal oxides), ii) at least partially depleting (120) the non-cellulosic foreign matters from the cellulose, to provide a depleted starting material (110), and iii) forming (170) the cellulosic paper material (150) from the depleted starting material (110). Furthermore, a cellulosic paper material (150) made (Continued)

of recycled used textiles and a use of used textiles for providing a cellulosic paper material (150) are described.

18 Claims, 1 Drawing Sheet

(56) References Cited

U.S. PATENT DOCUMENTS

| | | |
|---|---|---|
| 2007/0287820 A1 | 12/2007 | Weirich |
| 2015/0225901 A1 | 8/2015 | Asikainen et al. |

FOREIGN PATENT DOCUMENTS

| | | | |
|---|---|---|---|
| CN | 104 981 568 A | 10/2015 | |
| DE | 2 229 361 A1 | 1/1974 | |
| DE | 41 27 823 A1 | 3/1993 | |
| DE | 43 20908 A1 | 12/1994 | |
| DE | 44 17 503 A1 | 11/1995 | |
| DE | 297 05 010 U1 | 7/1997 | |
| DE | 198 49 427 A1 | 5/2000 | |
| DE | 199 54 643 A1 | 6/2001 | |
| DE | 101 04 259 A1 | 8/2002 | |
| DE | 202 08 950 U1 | 4/2003 | |
| DE | 10 2004 024 134 A1 | 12/2005 | |
| DE | 20 2008 001 546 U1 | 3/2008 | |
| EP | 0 649 895 A1 | 4/1995 | |
| WO | WO-9720102 A1 * | 6/1997 | .............. D21B 1/00 |
| WO | WO 2007/134842 A1 | 11/2007 | |
| WO | WO 2008/078247 A2 | 7/2008 | |
| WO | WO 2012/042146 A1 | 4/2012 | |
| WO | WO 2014/081291 A1 | 5/2014 | |
| WO | WO 2018/115428 A1 | 6/2018 | |

OTHER PUBLICATIONS

International Search Report and Written Opinion of corresponding PCT/EP2020/065036, Oct. 29, 2020, 19 pages.

European Search Report of corresponding EP 19 17 8178, Oct. 25, 2019, 9 pages.

* cited by examiner

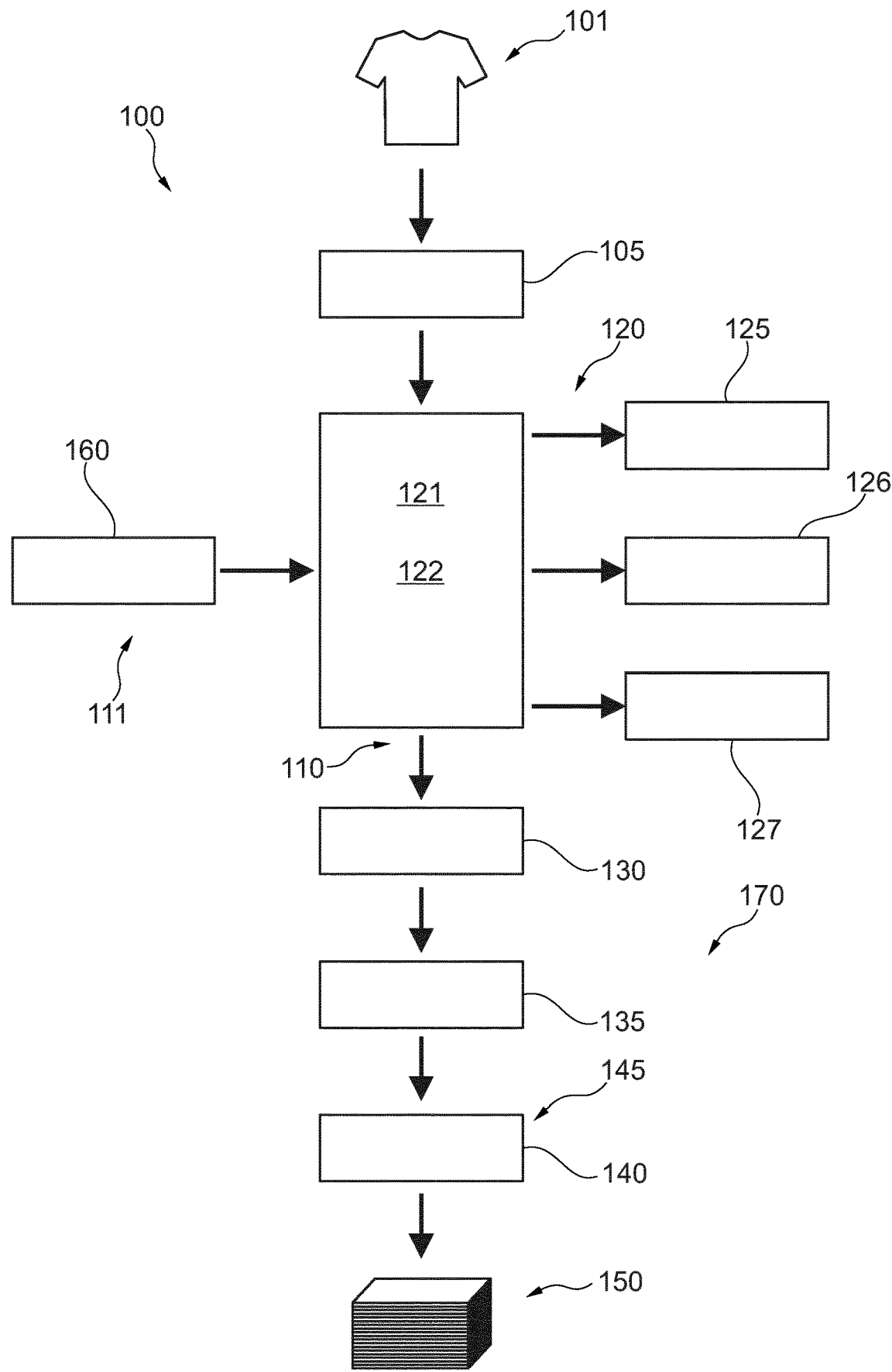

METHOD FOR PRODUCING A CELLULOSE PAPER MATERIAL FROM USED TEXTILES

CROSS-REFERENCE TO RELATED APPLICATION(S)

This application is a national US phase of PCT/EP2020/065036 which claims the benefit of the filing date of European Patent Application No. 19178178.0 filed 4 Jun. 2019, the disclosure of which is hereby incorporated herein by reference.

TECHNICAL FIELD

Embodiments of the invention relate to a method for manufacturing a cellulosic paper material. Moreover, embodiments of the invention relate to a cellulosic paper material made of recycled used textiles. Furthermore, embodiments of the invention relate to a use of used textiles for providing a cellulosic paper material. Additionally, embodiments of the invention relate to a method for selecting cellulose-containing used textiles and to a method for identifying a cellulosic paper material.

Therefore, embodiments of the invention may relate to the technical field of recycling used textiles. Furthermore, embodiments of the invention may relate to the technical field of manufacturing paper materials.

TECHNOLOGICAL BACKGROUND

Paper products, such as paper or cardboard, are mainly manufactured from the raw material wood. However, with respect to a resource-saving and ecological way of production, this may be considered as not actually satisfying. A supplement or alternative to this is the recycling of used paper. However, when using recycled materials as raw materials for the manufacture of pulp which is used for the paper manufacture, the problem of the purity of these recyclates occurs. These are frequently contaminated with materials which are not typical for wood. Moreover, in paper manufacture, a fiber may only be recycled a few times, since by the different treatment stages, the chain length (of the glucose units) and/or the fiber length of the cellulose become too short for a paper manufacturing process. Furthermore, it is technically problematic, to manufacture paper materials with specific properties from recyclates. Thus, recycled paper materials have to be elaborately (post)treated, to provide desired properties.

In hygienic papers and newsprint paper, nowadays, an increase of the used paper portion is hardly possible anymore. Therefore, to further increase the recovery quotes, used paper is increasingly utilized also for high-quality papers (for journals/magazines). However, in case of repeatedly recycling, as mentioned above, the fibers shorten and have to be discharged from the cycle. For this reason, fresh fibers, e.g. from magazines (groundwood) and/or from other sources have to be continuously introduced into the cycle. In this way, it is avoided, that multiply recycling may lead to a "recycling collapse". Therefore, there may be a need to configure the known paper production process in a more efficient way, but at the same time also more resource-saving.

SUMMARY OF THE INVENTION

There may be a need to provide a cellulosic paper material in an efficient, robust, and resource-saving manner.

The subject matters according to the independent patent claims are provided. Preferred embodiments result from the dependent patent claims.

According to an aspect of the present invention, a method for manufacturing a cellulosic paper material is described. The method comprises: i) providing used textiles as starting material, wherein the used textiles comprise cellulose and non-cellulosic foreign matters (in particular synthetic plastics), ii) at least partially depleting the non-cellulosic foreign matters from the cellulose, to provide a depleted starting material, and iii) forming the cellulosic paper material from the depleted starting material.

According to a further aspect of the present invention, a cellulosic paper material made of recycled used textiles is described, which comprises at least one of the following features:
  i) intrinsic non-cellulosic foreign matters (in particular metal oxides, further in particular pigments), wherein the intrinsic non-cellulosic foreign matters are incorporated in the paper material,
  ii) synthetic plastic (in particular PUR, further in particular elastane), wherein the synthetic plastic is incorporated in the paper material,
  iii) 10% or less cellulose with an average degree of polymerization in the range of 50 to 200 monomers,
  iv) cellulose with an average degree of polymerization of 300 monomers (limiting viscosity number approximately 175 mL/g) or more, in particular 500 monomers or more.

According to a further aspect of the present invention, a use of (treated) used textiles as starting material for providing a cellulosic paper material is described.

According to a further aspect of the present invention, a method for selecting cellulose-containing used textiles (in particular from a used textile raw recyclate) is described. The method comprises: i) determining a quality criterion which is indicative for the quality (in particular the average degree of polymerization) of the cellulose, ii) comparing the determined quality criterion with a predefined quality criterion, and, based on the result of the determination: a) supplying first cellulose-containing used textiles, whose quality criterion does not correspond to the predefined quality criterion, to a method for manufacturing a paper material, in particular an above described method for manufacturing a paper material; b) supplying second cellulose-containing used textiles, whose quality criterion corresponds to the predefined quality criterion, to a method for manufacturing a regenerated cellulosic molded body (in particular by a lyocell method, or a viscose method (in particular a carbamate method or a cold alkali method)).

According to a further aspect of the present invention, a method for identifying a cellulose-comprising paper material (in particular a paper material as described above) is disclosed. The method comprises: i) detecting a data set which is indicative for multiple constituents of the paper material, ii) storing the data set which correlates to the paper material in a database, and iii) comparing the information with the data set in the database. The multiple constituents relate to intrinsic non-cellulosic constituents of the paper material, and the intrinsic non-cellulosic constituents originate from used textiles.

In the context of this document, the term "non-cellulosic foreign matters" may denote each material which is present in the starting material (in particular a mixed textile), but is not based on cellulose. However, these include not only unavoidable contaminations, but significant amounts of e.g.

synthetic fibers (plastic fibers) and/or metal oxides which are present in the starting material (mixed textiles).

In the context of this document, the term "cellulose" may in particular denote an organic compound which is a constituent of plant cell walls or may be synthetically manufactured. Cellulose is a polysaccharide (i.e. a multiple sugar). Cellulose is unbranched and typically comprises multiple hundred to ten thousands β-D-glucose molecules (β-1,4 glycosidic bond) and cellubiose-units, respectively. From cellulose molecules, cellulose fibers are built by plants in a controlled manner. With a technical process, glucose molecules may be agglomerated under formation of regenerated fibers, for example as essentially tearproof fibers.

In the context of this document, the term "used textiles" may denote remains from a clothing manufacture and used clothes.

In the context of this document, the term "remains from a clothing manufacture" may in particular denote rejects and/or cutting waste (German: Verschnitt) of a textile or yarn which comprises or consists of cellulose, wherein these remains occur during a method for manufacturing clothing. When manufacturing clothing, for example a cellulose-comprising textile is manufactured as starting material, from which planar portions (for example with a shape of a T-shirt half) are subsequently cut. Remains remain, which, according to an exemplary embodiment, may be resupplied to a method for manufacturing a cellulose-comprising molded body. Thus, residues from a clothing manufacture may be a starting material which comprises or consists of cellulose, which may be used for a recovery of cellulose, before a user has used the remains as clothing or in another way. In particular, remains from a clothing manufacture may substantially be made of pure cellulose, in particular without foreign matters which are separate and do not comprise cellulose (such as buttons, textile print or seams).

In the context of this document, the term "used clothes" may in particular denote cellulose-comprising clothing or home textiles (e.g bed clothes etc.) which are already used (in particular worn) by a user when recovering at least a part of the cellulose. Thus, used clothes may be a cellulose-comprising starting material which may (but does not have to) comprise significant amounts of foreign matters, and may be used for recovering cellulose, after a user has used the used clothes as clothing or in another way. In particular, used clothes may be made of a mixture of cellulose and one or more foreign matters, in particular comprising (in particular in clothing frequently used) synthetic plastic (such as polyester and/or elastane) and/or foreign matters which are separate and do not comprise cellulose (such as buttons, textile print, or seams). In particular, polyester denotes polymers with ester functions (R—[—CO—O—]—R) in their main chain. Polycarbonates and polyethylene terephthalate belong to polyesters. Elastane in particular denotes a stretchable chemical fiber with a high elasticity. A block copolymer on which elastane is based may contain a mass portion of at least 85% polyurethane.

The term "new textiles" encompasses textile raw materials (natural fibers, chemical fibers), and non-textile raw materials which were processed by one or more methods to line-, plane-shaped, or spatial products. The term "new textiles" may correspond to the term "rejects from the clothing manufacture", and may also denote finished products (e.g. clothes, bed clothes), wherein the latter was substantially not used/worn by a user yet. In an embodiment, it is differentiated between used textiles and new textiles. In another embodiment, the term used textiles may also encompass these new textiles (finished textile products which are not used may be also denoted as used textiles and/or clothing rejects).

The term "synthetic plastic" may in particular denote a material which is made of macromolecules and is manufactured synthetically. The respective macromolecules of a plastic are polymers and are therefore made of repeating basic units (repeating units). The size of the macromolecules of a polymer may vary between some thousands up to more than one million basic units. For example, the polymer polyethylene (PE) consists of connected, multiply repeating ethylene units. The polymers may be unbranched, branched, or cross-linked molecules. With respect to their physical properties, plastics may be principally classified into three groups: thermoplast, thermosetting plastic (German: Duroplast), and elastomers. Furthermore, these properties may also be combined in subgroups, e.g. in case of thermoplastic elastomers. Important features of plastics are their technical properties, such as formability, hardness, breaking strength, temperature-, heat resistance, and chemical resistance, which may be broadly varied by the selection of the macromolecules, manufacturing methods and typically by adding additives. Typical reactions for manufacturing synthetic plastic from monomers or pre-polymers are: chain polymerization, polyaddition, or polycondensation. Examples for synthetic plastics which are in particular also used in textiles, are e.g. polyurethane (PUR), in particular as constituent of elastane, polyester (PE, e.g. polyethyleneterephtalate (PET)), polyamide (PA, e.g. nylon, perlon), and polyether, in particular polyethylene glycol (PEG) as constituent of elastane. In this context, synthetic plastic may form the synthetic fibers in a textile and/or used textile.

In the context of this document, the term "elastane" may in particular denote a synthetic plastic which comprises thermoplastic and elastic properties. Elastane may therefore be denoted as thermoplastic elastomer (TPE). Elastane may be present as block copolymer which is in particular characterized by the following both blocks: polyurethane (PUR) and polyethylene glycol ether (PEG). The PUR segments may form stiff sections; which alternate with soft, elastic PEG sections. PUR may form stiff, elongated sections which attach to each other in a lengthwise manner and enable the cohesion, e.g. of a fiber, by forming secondary valence forces. In contrast, the rubberlike PEG blocks (e.g. respectively approximately 40 to 50 monomer units) may be present in a highly entangled manner, wherein they may nevertheless be stretched. Elastane may be present as frizzle structure (German: Kräuselstruktur) with a very high stretchability (multiple 100%, e.g. 700%). The density may be between e.g. 1.1 and 1.3 $g/m^3$ and the rigidity may be 5 to 12 cN/tex, for example. The elasticity may be temperature-dependent. Furthermore, the term "elastane" may denote both elastane itself, and also related thermoplastic elastomers (e.g. lycra, elastollan, desmopan, texin, and utechllan).

In the context of this document, the term "paper manufacture" may in particular denote, that from a cellulose-containing and treated starting material, a cellulosic paper material is formed, which is then further processed to a paper product. All processing stages which lead from a cellulose-containing starting material to a paper material may thus be denoted as paper manufacturing method. Furthermore, all processing stages which lead from the paper material to a paper product may be denoted as paper manufacturing.

A "paper material" may be denoted as paper starting material in this context, from which a paper product, such as a paper, a cardboard, a filter or the like may be formed. A paper material may be a composite material which contains at least pulp (cellulose) and a binder. The paper material may be present in solid form, but also as a suspension, e.g. in water. In a broader sense, a "paper material" may also encompass the paper product itself. Furthermore, a paper material may also encompass paper or materials which are similar to paper, such as cardboard, filter material, isolation mats, absorbing fleeces, fiber reinforced planar materials etc. Paper material may be formed by dehydration of a fiber suspension, e.g. on a sieve. The paper material may be further compacted and dried in following process stages. However, a paper material may also be a planar material (fiber fleece) which substantially consists of (cellulose-) fibers.

In the context of this document, the term "depleting" may in particular denote a process by which a component is at least partially removed from a mixture of at least two components. For example, a used textile may comprise the components cellulose and a polyester, such as PET. When the portion of the component PET is reduced, it may be denoted as depleting the PET. A plurality of possibilities are known, to perform such depleting. At first, depleting may be performed mechanically, ag by a density separation. Additionally or instead, depleting may be performed by mechanically separating. Examples for this are hydrolyzing or derivatizing the component to be depleted. Moreover, the component to be depleted may be removed by a solvent. In depleting, the component to be depleted may be degraded and/or destroyed. Moreover, the component to be depleted may be present in its original form, i.e. non-degraded after depleting. In other words, the term "depleting" may in particular denote, that an incoming starting material is treated (depleted), such that an outgoing depleted starting material at least partially differs from the incoming starting material in its chemical/physical properties and/or in its material composition, in particular at least comprises one component in a lower concentration. During a chemical depleting process, for example a boiling process may be performed, in particular an alkaline boiling. Furthermore, during a depleting process, for example synthetic fibers, such as polyester, may be depleted from the cellulose (by the boiling).

In the context of this document, the term "degree of polymerization" may denote the number of basic units (monomers) per polymer molecule (e.g. cellulose molecule). The degree of polymerization may be identical with the quotient of the average molar mass of the polymer and the molar mass of its repeating unit (the monomer unit). The exact number, except in case of proteins, may frequently be only an average value over the considered sample. This average value is denoted as average degree of polymerization (DP). The degree of polymerization and the geometric distribution of the monomers in the molecule (i.e. the stereochemical arrangement of the molecule branches) may possess a large influence on the physical and especially the mechanical properties of a polymer. For example, the DP for cotton is approximately 3000 or more, for viscose fibers 250 to 700, for polyimide 100 to 180, and for polyester 130 to 220.

According to an exemplary embodiment of the invention, an especially efficient, robust, and resource-saving method for manufacturing a cellulosic paper material is provided by using (cellulose-containing) used textiles as starting material, from which, after at least partially depleting the non-cellulosic foreign matters from the cellulose, the cellulosic paper material may be formed. For manufacturing a paper material, wood is conventionally used as starting material, respectively in recycling, then used paper. In the case of wood, the problem arises, that finally continuously new trees have to be chopped, which is associated with a high effort and is less resource-saving. In contrast, as mentioned above, used paper leads to the problem, that in the course of multiple recycling cycles, the fiber-, and chain lengths (glucose units) of the cellulose are getting shorter, so that they have to be removed from the recycling cycle. When certain properties in the paper material shall be achieved, this is conventionally only possible with a very high additional effort. Now, it has surprisingly turned out, that used textiles (which comprise cellulose and further foreign matters) constitute an excellent starting material for the paper manufacture.

According to an exemplary embodiment of the invention, in the manufacture of a paper material, providing and/or adding a high-quality cellulose may be performed. This high-quality cellulose may be present in a purity which is mainly used in processes of the textile-related industry, since in a fiber processing for yarn- or fleece formation, generally especially high cellulose qualities are required. Cellulose from used textiles may origin from cotton to a high percentage and has thus naturally an especially high quality compared to common wood-cellulose, in particular with respect to tensile strength, tenacity, elongation, etc. In particular, these special quality features may be based on the associated chain lengths of cotton.

In the past, used textiles are not considered as cellulose-source for the paper manufacture, since today's used textiles may be highly contaminated with foreign matters, such as plastics (synthetic fibers) or metal oxides, such as pigments. On the one hand, since the textiles consists of plastics (such ones may be sorted as a whole), but on the other hand, since today many used textiles which mainly consist of natural fibers are partially contaminated with plastic amounts, or a plastic was applied on a natural fiber for a property change. However, it has surprisingly turned out now, that residual constituents in used textiles, in particular metal oxides and certain plastics, may be used in the context of the pulp treatment as positive property changers.

In summary, it was found that used textiles are a surprisingly efficient and resource-saving starting material for the paper manufacture, which provides a multiplicity of unexpected and flexibly usable advantages.

In the following, additional embodiments of the methods and the use are described.

According to an embodiment, depleting further comprises: i) mechanically separating at least a part of the non-cellulosic foreign matters, and/or ii) chemically separating at least a part of the non-cellulosic foreign matters. This may have the advantage, that thoroughly depleting may be performed with known and established methods.

According to an embodiment, separating the non-fiber constituents from the fiber constituents may be performed due to different physical properties, in particular by metal deposition and/or gravitational deposition. Metallic components (e.g. zip fasteners, rivets, etc.) may be separated due to their magnetic properties, for example. Also different influences of the gravitational force on the different constituents may be utilized for separating.

According to an embodiment, mechanically separating may be performed based on density differences between the non-cellulosic fibers and the cellulosic fibers. For example, in a centrifuge, materials with a different density may be separated due to differently strong centrifugal forces. After transferring the constituents in a liquid medium, due to different densities, they may partially collect at the surface, while other constituents are floating or deposit at the ground.

According to an embodiment, mechanically separating may be performed based on different electrostatic properties between the non-cellulosic fibers and the cellulosic fibers. Due to different electrostatic properties, the different fibers may react upon an applied electric field in a different way. This in turn enables separating the cellulosic fibers with respect to non-cellulosic fibers.

According to an embodiment, mechanically separating may comprise suspending (i.e. transferring into a suspension) the fiber constituents in a liquid medium, in particular an aqueous medium, and separating the non-cellulosic fibers from the cellulosic fibers due to different physical properties in the liquid medium (in particular different gravitational, centrifugal force-related, floating and/or electrostatic properties). When the different fibers in a liquid medium show a different behavior due to their different composition, this enables a separation of the different fiber constituents as well.

According to an embodiment, the liquid medium may comprise at least one additive for enhancing the different physical properties, in particular a dispersing agent and/or a swelling agent. In particular, a dispersing agent or dispersant may denote additives which enable or stabilize dispersing, i.e. a fine distribution of a substance (for example a fiber) in a continuous medium (for example in a liquid). In particular, a swelling agent may denote additives which promote a swelling of a substance. Swelling may denote a process, wherein a substance (in particular a liquid) introduces into a solid body and causes an enlargement of the latter. When one or more such additives are added to the medium, the discrepancies in the properties of the diverse fibers, which are necessary for the mechanical separation of the different fibers, may be increased. This increases the efficiency of the separation.

According to an embodiment, chemically separating may comprise selectively solving only at least a part of the non-cellulosic fibers or only at least a part of the cellulosic fibers in a solvent, and separating, in particular filtering, at least a part of the non-solved fiber constituents. In other words, the different fibers may be supplied to a (for example liquid, in particular aqueous) medium, in which only certain ones of these fibers, in particular selectively polyester fibers, distinctly solve, whereas other fibers, in particular cellulose fibers, show no or only a weak solving behavior. The fibers which do not solve or do not considerably solve or solve weaker (in particular cellulose fibers) may be filtered or centrifuged and may then be further treated separately from the solved fibers.

According to an embodiment, mechanically separating and/or chemically separating may comprise a separating of synthetic fibers as non-cellulosic fibers. In the reused textile materials, in particular used clothes and/or textile waste residues, non-cellulosic fibers of a synthetical origin are frequently found. As example for such synthetic fibers, polyester, polyamide and/or elastane may be mentioned. These may be effectively separated from the cellulose fibers by the here described methods.

According to an embodiment, chemically separating may comprise supplying an alkaline solution, in particular using oxidized agents, in particular an alkaline boiling. In particular, supplying the alkaline solution for degrading non-cellulosic fibers, in particular synthetic fibers, further in particular polyester fibers, may be performed. Especially polyester may thereby be split into water-soluble constituents which may be separated from the cellulose fibers by the wastewaters which occur in the process.

According to a further embodiment, chemically separating further comprises: performing a boiling process, in particular by an alkaline boiling solution. This has the advantage; that depleting may be performed in an efficient way by established methods and is therefore implementable in a simple manner.

According to a preferred embodiment, the alkaline boiling of the cellulose-based (in particular cotton-based) textile material which is preprocessed as described, from which cellulosic fibers are enriched (i.e. mainly cellulosic fibers are obtained) may be further processed for generating further purified pulp as follows: the fibers; in particular already enriched cellulosic (or mainly cellulosic) fibers; may be treated with an alkaline solution (for example sodium hydroxide or potassium hydroxide) in combination with a gaseous oxidizing agent (for example $O_2$) in a pressure vessel (preferably at a pH-value of at least 9), namely according to an exemplary embodiment:
   a) at a temperature between 90° C. and 185° C.;
   b) for an incubation time of 45 minutes to 270 minutes;
   c) in the presence of a cellulose-stabilizing additive (for example a magnesium salt, preferably magnesium sulfate; or a chelating compound on basis of a transition metal, for example ethylenediaminetetraacetic acid (EDTA)), preferably in a concentration in a range between 0.01 weight percent and 5 weight percent with respect to the supplied fibers;
   d) at an alkali concentration in a range between 1 weight percent and 35 weight percent with respect to the supplied fibers;
   e) at an initial gas pressure in a range of 1 bar to 21 bar (correspondingly approximately 0.1 MPa to approximately 2.1 MPa).

The generated pulp may subsequently be subjected to a washing procedure.

According to an embodiment, chemically separating may comprise converting at least a part of the non-cellulosic fibers into soluble, in particular water-soluble, substances, solving the soluble substances in a solvent, in particular an aqueous solvent, and separating, in particular filtering, non-solved cellulosic fibers from the solved substances. Thus, the different fibers may be supplied to a (for example aqueous) solvent, in which only non-cellulosic fibers distinctly solve. The fibers which do not solve or do not noteworthy solve or solve weaker (in particular cellulose fibers) may be filtered or centrifuged and may then be further processed separately from the solved fibers.

According to a further embodiment, the boiling process is performed such that the degree of polymerization of the cellulose of the starting material is within a predefined range. This has the advantage, that especially high-quality cellulose for the paper manufacture may be provided.

Partially degrading the cellulose fibers in a chemical milieu may be advantageously controlled by influencing the chemical environment, so that a resulting degree of polymerization of the cellulose is within a desired range. In particular, boiling may be performed in a shortest possible time period, so that a lowest possible reduction of the degree of polymerization of the cellulose is performed.

According to a further embodiment, depleting further comprises: supplying an oxidizing agent, in particular oxygen, to the boiling process. This has the advantage, that the method may be performed in an especially time-saving and at the same time efficient manner, since an additional bleaching process is not required anymore. It has turned out, that a (gaseous) oxidizing agent which is supplied to the alkaline boiling process leads to a special brightness of the depleted starting material (and thus also of the paper material). Therefore, e.g. an ISO brightness of 90% or more for the paper material may be achieved even during the boiling process, without the need of an additional bleaching process.

According to a further embodiment, depleting further comprises: controlling the process parameters, such that the degree of polymerization of the cellulose of the depleted starting material is substantially in a predefined range. In particular, the cellulose comprises an average degree of polymerization of 200 monomers or more, in particular 300 monomers or more, further in particular 500 monomers or more. Further in particular, the cellulose comprises 10% or less cellulose with an average degree of polymerization in the range of 50 to 200 monomers. This has the advantage, that especially high-quality cellulose may be provided for the paper manufacture.

As already described above, for the recycling process, a cellulose with long chains, i.e. a high average degree of polymerization, is especially advantageous. A disadvantage of the recycling is the shortening of the chain length over multiple recycling cycles. This disadvantage may be overcome by using used textiles as cellulose source, which naturally comprise cellulose with a very long chain length. For example; cotton has an average degree of polymerization of approximately 3000. In the depleting process, it is attempted to provide cellulose with a possibly high average degree of polymerization. The process parameters may be correspondingly controlled. For example, the boiling process is performed, such that as far as possible no and/or a very low degradation of the cellulose polymers is performed (e.g, by reduced boiling times, a low temperature, cellulose-stabilizing agents). Furthermore; the used textile mixture may be specifically combined; so that as many high-quality cotton as possible is contained therein.

According to a further embodiment, depleting further comprises: depleting (in particular selectively depleting) cellulose, whose degree of polymerization deviates from a predefined interval. In particular, the cellulose comprises an average degree of polymerization of 200 monomers or more; further in particular 300 monomers or more, further in particular 500 monomers or more. The cellulose comprises 10% or less cellulose with an average degree of polymerization in the range of 50 to 200 monomers. This has the advantage, that especially high-quality cellulose may be provided for the paper manufacture.

In selectively depleting, cellulose with a short chain length may be intentionally removed from the starting material, so that the cellulose of the starting material comprises an average degree of polymerization in a predefined range. For example, a mechanical separation, e.g. a size separation (filtering cellulose fine material) may be performed, to separate the shorter (more lightweight) cellulose polymers from the longer (more heavyweight) cellulose polymers.

According to a further embodiment, the method further comprises: mixing the depleted starting material with a further starting material for obtaining a mixed starting material. In particular such that the mixed starting material comprises predefined properties. This has the advantage, that properties of the depleted starting material, and therefore also of the paper material to be manufactured, may be controlled in a specific and simple manner.

The further starting material may also comprise used textiles or may be an additional material, such as cellulose, (paper-), used paper, plastic, or another foreign matter. The further starting material may be mixed with the starting material during depleting (e.g. during a boiling process), but may also be mixed with the starting material before depleting or after depleting. The further starting material may comprise the same composition as the starting material or another. Preferably, the further starting material has a predefined composition, so that specifically desired properties may be caused in the mixed starting material and/or in the paper material to be manufactured. For example, the further starting material may contain high-quality cellulose, so that the paper material comprises especially long cellulose polymers. Moreover, the further starting material may comprise e.g. elastane, which could serve for an improved oil absorbing capability in the paper material. Thus, the further starting material may specifically influence the composition of the paper material.

In an embodiment, in the starting material, by selectively depleting the present residual plastics, a desired amount of these plastics (e.g. PET and/or PUR) is adjusted. The processed starting material is then mixed with a further starting material (e.g cellulose or a used textile mixture) with another composition, whereby the final properties of the paper product according to the method may be significantly controlled and adjusted, respectively.

In an embodiment, different used textile mixtures of a different composition are mixed, such that the desired amounts of different plastics result. This chemistry-reduced/chemistry-free embodiment (achieved only by mixing starting materials) is interesting in terms of resource consumption and due to ecological aspects. The paperlike products which, according to embodiments of the invention, are manufactured from such a mixture, have a constant quality with respect to the resulting final properties, despite the variable quality of the starting materials.

According to a further embodiment, the method further comprises: partially depleting (in particular selectively depleting) the non-cellulosic foreign matters from the cellulose, such that at least one predefined synthetic plastic at least partially remains in the depleted starting material (in particular such that the formed paper material comprises predefined properties). This has the advantage, that properties of the depleted starting material, and thus also of the paper material to be manufactured, may be controlled in a specific and simple manner, while at the same time the depleting process may be performed in a less complex manner.

According to a further embodiment, the predefined synthetic plastic which remains at least partially in the depleted starting material comprises PUR, in particular elastane. This has the advantage, that positive properties, such as an increased oil absorbing capability, are obtained without additional effort, and at the same time, the depleting process is simplified.

For the manufacture of paperlike products, recycling materials may be used in the pulp manufacture, which do not origin from a paper-based recycling cycle, such as used textiles. When treating these recycling materials (textile recycling), when closing a substance cycle, different undesired foreign matters occur, which have to be removed in the manufacture of a fiber, so that the technical/physical properties get sufficiently similar with respect to a non-recycled fiber. Usually, such foreign matters, in particular polyurethanes, are eliminated as completely as possible.

Now, it was surprisingly found, that by a specific control of residual concentrations in the context of the treatment method (i.e. the treatment of the used textiles), new properties in the resulting cellulose and/or its binder-based subsequent products may be achieved. The such achieved functionalization and/or depletion of residual constituents from the recyclate, which are based on the control of the conversion of thermoplastic plastics, enable an overcompensation of the fiber length problem (and/or the associated hardness problem) which otherwise occurs in the paper manufacture in the pure paper recycling.

In particular, by a specific amount of residual polymers (preferably polyurethanes, like e.g. elastane), a compensation (increase by the elastane amount, reduction by used cellulose) of the hardness values may be achieved, which would be usually significantly reduced by adding recycled cellulose, since a reduction of the average chain length is associated with the recycling process.

At elevated temperatures (which may be achieved in the paper manufacture e.g. already by drying), the thermoplastic effect of the elastane (respectively TPE) gets utilizable: in figurative language, this leads to a certain controllable adhesiveness in the region between the cellulose fibers and/or in the interaction with binders, which may be used for thermoplastic adhesion effects.

By the treatment of the starting material according to embodiments of the invention, it is ensured, that the remaining residual polymers from e.g. PU, PA, polyester, etc. remain in the suitable concentration for a binder-based further processing. When this is achieved, the plastic amounts which are present in a pulp act similar as a composite system fiber-thermoplast.

In a further embodiment, (residual) polymers from used textiles are used as adhesion promoter among the cellulose fibers or as thermoplastic property enhancer in the context of the manufacturing process of a paper product (e.g. a paper-like planar material). This use as hot melt adhesive and/or binder interaction and/or hemicellulose-substitute is based on the material amounts which are present in the used textiles, for example. For example in iron free shirts, these substances and pre-processed cellulose-components are substantially inert, until the completion of a certain stage in the production process. In particular, in this way, a retroactive stiffening of a subsequent product by heat (analog to hot melt adhesive) may be achieved. For manufacturing composite materials which have the property of a high dimensional stability (e.g. pleated paper filters), conventionally an elaborate method is used, which is else used in the textile industry: by the combination of very elaborate chemical methods, such as the treatment with liquid ammonia. It makes the shirt look new for a long time. Even more important is the so-called "humid cross-linking", wherein an elastic bridge is formed between the molecules of the cotton cellulose. This bridge pulls the fabric in shape again after washing. The humid cross-linking with "synthetic resins" requires a highly precise mode of operation.

By the specific control of the amount of residual plastics (such as elastane from used textiles), a certain thermoplasticity of the resulting composite material may be achieved, which leads the corresponding amount of residual plastics from the used textiles by the depletion- and recombination processes via the newly implied properties of the cellulose according to embodiments of the invention to new properties in a composite material.

According to further embodiment, depleting of the method further comprises: at least partially retaining a synthetic plastic in the starting material. In particular, the synthetic plastic may be one of the group, which is consisting of polyamide, polyester, polyurethane, and elastane. This may have the advantage, that a synthetic plastic does not have to be depleted in an especially clean and/or pure manner. Depleting small residual concentrations may in fact be technically challenging and resource-intensive.

Instead, synthetic plastic, e.g. polyurethane, may remain in the mixed textile, whereby elaborate and cost intensive depleting processes may be reduced and/or are not required anymore. When at least a part of the polyurethane is assigned to elastane, additionally even further advantages may be achieved, such as an improvement of the rigidity values and/or the elasticity of the molded body to be manufactured.

Low amounts (e.g. below 2%) of e.g. polyamides and polyesters may be co-processed in the recycling method, to achieve a good incorporation in cellulose. In a recycling method, this may be a significant advantage, since at least partially removing further synthetic polymers, in particular in low concentrations, may be disproportionally elaborate. The above mentioned further synthetic plastics may be very frequently and commonly contained in starting materials, such as textiles. Therefore, an acceptance of low residual amounts is a massive facilitation of a recycling method.

According to a further embodiment, the used textiles comprise a first synthetic plastic, in particular polyamide and/or polyurethane. The used textiles also comprise a second synthetic plastic, in particular polyester, further in particular polyethyleneterephtalate (PET). In addition, depleting further comprises: i) at least partially depleting the first synthetic plastic to a first concentration value, ii) at least partially depleting the second synthetic plastic to a second concentration value. The first concentration value is different from the second concentration value, in particular larger. This has the advantage, that technically elaborately and cost-intensively depleting a further plastic is at least partially omitted. Instead, the presence of at least one further synthetic plastic may even influence and/or control the properties of the paper material to be manufactured in an advantageous manner.

According to a further embodiment, depleting further comprises: at least partially (selectively) retaining metal oxides, in particular titanium dioxide, such that they may act as an oxidation catalyzer for organic contaminations. This has the advantage, that (residual) contaminations may be removed in a simply controllable manner, which otherwise would be hardly removable.

Metal oxides, such as titanium dioxide, typically in a very fine distribution, e.g. in association with UV-light (free application), may serve as oxidation catalyzer for degrading organic contaminations, which in particular contain —OH, —O, COOR, —C=C—, groups. Examples for such organic contaminations may be: oils, fats, solvents, salves, glycols (antifreeze agents), biodiesel. This oxidizing catalysis may lead to advantages, in particular in case of a low contamination load.

According to a further embodiment, a use of metal oxides (in particular titanium dioxide) as oxidation catalyzer (in particular in association with UV-light) of organic contaminations in a depleted starting material and/or a paper material is described.

According to a further embodiment, the method further comprises: partially (in particular selectively) depleting the non-cellulosic foreign matters from the cellulose, such that intrinsic foreign matters (in particular metal oxides, further in particular pigments) remain in the depleted starting material. This has the advantage, that efficiently encoding (fingerprint) the paper material is possible without additional effort.

According to a further embodiment, depleting further comprises: (essentially) completely depleting the intrinsic non-cellulosic foreign matters (in particular the synthetic fibers) from the cellulose, such that highly pure cellulose fibers are provided as depleted starting material. This has the advantage, that highly pure cellulose for the paper manufacture may be obtained in a simple manner from a raw material (namely used textiles) which is present in a large amount and cost-efficient.

In this context, the term "completely removing" denotes that it is attempted, to remove as far as possible all foreign matters. In other words: no foreign matters shall be retained. It is clear for a person skilled in the art, that completely depleting each foreign matters is technically highly difficult, since contaminations in very low amounts may remain. For this reason, the formulation "substantially" is chosen, wherein this may denote, that completely removing (as far as technically realizable) is desired.

According to a further embodiment, the method further comprises: i) supplying the depleted starting material (in particular as aqueous cellulose suspension) to a pulp, and forming the cellulosic paper material from the pulp. This has the advantage, that the depleted starting material may be especially efficiently and using approved techniques converted into the cellulosic paper material.

In this context, the term "pulp" may denote the mixture of water, cellulose, and binder, which is present in the typical paper manufacture, from which the paper is manufactured. For simplification, in the context of this document, "pulp" denotes each form of aqueous intermediate solutions, which contain an amount of cellulose and a binder. As binders, also non-typical paper binders may be used.

In an embodiment, the aqueous intermediate product which is obtained in the depleting process of the used textiles is not dried to the typical dry cellulose form, but is also further processed in the still not dehydrated condition, which enables the mixture of aqueous cellulose suspensions for a liquid stream, for example, which is supplied to the pulp generation.

According to an exemplary embodiment, by the above described method for selecting used textiles, it is possible to perform an efficient disintegration of the raw recyclates (used textiles): the used textiles amount which yields the qualitatively best recycling cellulose, may be used for textile-related production processes, while the used textiles amount, which is not ideally suitable for these quality levels is used for the paper manufacture. The quality criterion may be e.g. the average degree of polymerization of the cellulose, wherein a high average degree of polymerization may constitute a high quality. The selection may be performed during a depletion process or may be already performed at the used textile mixture.

The used textile amount which was selected for the clothing manufacture, may be supplied to e.g. a lyocell method or a viscose method (in particular a xanthogenate method; a carbamate method, or a cold alkali method).

In the context of this document, the term "lyocell-method" in particular may denote a method for manufacturing cellulose according to a direct-solvent method. The cellulose for the lyocell-method may be obtained from a starting material which comprises this cellulose. In the lyocell-method, the starting material may be solved in a suitable solvent (in particular comprising tertiary amine oxides, such as N-methylmorpholine-N-oxide (NMMO) and/or ionic liquids, i.e. low melting salts, which are made of cations and anions). In particular, solving may be performed by dehydration and/or without chemical modification. In the lyocell-method, the obtained solution, which may also be denoted as dope or spinning solution, may subsequently be pressed through one or more spinning jets. Filaments which are formed thereby may be precipitated during and/or after their free or controlled fall through an air gap in a water-containing bath (in particular in a bath with aqueous NMMO-solution) and/or in air humidity which is present in the air gap.

In the context of this document, the term "viscose method" may in particular denote a method for manufacturing cellulose according to a wet spinning method. The cellulose for the viscose method may be obtained from a starting material (in particular wood or a wood pulp) which contains this cellulose.

In the context of this document, the term "viscose method" may denote a xanthogenate method. In the viscose method, which is performed as xanthogenate method, in subsequent process stages, the starting material may at first be treated with a base (for example with caustic soda lye), whereby alkali cellulose is formed. In a subsequent conversion of this alkali cellulose with carbon disulfide, cellulose-xanthogenate is formed. From this, by further adding a base (in particular caustic soda lye), a viscose-spinning solution may be generated which may be pressed through one or more spinning nozzles. In a spinning bath, viscose-filaments are generated by coagulation. The thus manufactured viscose-filaments are subsequently cut, e.g. to viscose-staple fibers.

In the context of this document, the term "viscose method" may also denote a carbamate method, wherein instead of carbon disulfide, ammonia is used for manufacturing a soluble cellulose derivate. Instead of the cellulose-xanthogenate, the so-called cellulose-carbamate is generated. Analog to the further use of the cellulose-xanthogenate, from the cellulose-carbamate, a spinnable solution is manufactured from which, after pressing through one or more spinning nozzles, cellulose-filaments may be regenerated in a spinning bath.

Furthermore, in the context of this document, the term "viscose method" may also denote a cold alkaline method, wherein cellulose is solved without further derivatizing to the xenthogenate or carbamate in a tempered, in particular cooled, aqueous alkaline medium. In an embodiment, the temperature of the aqueous alkaline medium is less than 20° C., in particular also less than 5° C. For improving the solving behavior, additives may be added to the aqueous alkaline medium, such as urea, thio urea, zinc oxide, polyethylene glycol, or tensides. Again, from the cellulose-containing spinning solution, cellulose-filaments are regenerated after passing through one or more spinning nozzles, by precipitating in an acidic or alkaline spinning bath.

According to an exemplary embodiment, the above described codification may ensure a reliable quality of cellulose-comprising paper materials.

In the context of this application, the term "constituents of the paper material" may in particular denote different materials and/or components or constituents of the cellulose-comprising paper material and/or the resulting paper product, which are metrologically distinguishable. In this context, the term "paper material" denotes both the starting material (the pre-product) and the paper product to be generated. The constituents of the paper material on the one hand may be dependent on a starting material for manufacturing the paper material and on the other hand may be dependent on a method for manufacturing a paper material. The combination of the constituents and the amounts of a paper material may therefore be indicative for a certain paper material or a certain charge of the paper material which was manufactured on basis of certain starting materials with a certain method. For example, such a constituent may be a main constituent of the paper material (for example cellulose which may be present with different fiber geometries and which may be spectroscopically distinguishable (for example by a crystallinity determination via NMR) due to different products compositions of the used cellulose sources). However, such a constituent may also be a foreign matter which is also contained in the finished product, as a result of the use of certain starting materials and/or cellulose sources (for example polyester and elastane in the case of a recycling of used textiles). A constituent may also be a trace element which goes back to a cellulose source and/or a starting material (for example titanium dioxide or a rare earth metal). These may be detected by different analytical methods, e.g. mass spectrometry. Moreover, it is also possible, that a constituent of the paper material is analyzed which was not yet contained in the starting material and/or the cellulose source, but was only added to the paper material during or after the manufacture of the cellulose fibers or another cellulosic molded body, for example as colorant marker.

In the context of this application, the term "data set" may in particular denote (for example electronically storable) data, whose data content indicates, for multiple constituents, their presence and/or absence in a paper material and/or the paper product manufactured therefrom, or even indicates their amount in the paper material. For example, the data set may comprise a sequence of logical values "1" and logical values "0", therefore a binary code and/or a binary sequence which indicates the compliance or non-compliance with a respective criterion with respect to a certain paper material which is associated with a certain constituent. For example, 1 bit of such a data set may indicate, if a paper material has a concentration of a metal oxide above (corresponding to a logical value "1") or below (corresponding to a logical value "0") a pregiven threshold value. In this way, by a compact data structure, a fingerprint of a certain paper material may be represented on basis of its constituents.

In the context of this application, the term "database" may in particular denote an entity of data sets (which may be stored in a data storage, for example, further in particular an electronic mass storage (for example a hard disk)). Such a database may be arranged locally at a device for manufacturing paper materials or at a remote location, for example cloud-based.

According to an exemplary embodiment of the invention, an encoding system for paper materials is provided, wherein after the manufacture of such a product, an information about preferably multiple constituents of this specific paper material is metrologically detected and stored as data set. This data set may be assigned to this specific paper material. This procedure may be repeated for many paper materials. The data set for a certain paper material is significantly depending on the starting materials (for example wood, remains from the clothing manufacture, used clothes, natural cotton, etc.) for manufacturing the paper material, and on the used manufacturing method. For example, when inhomogenous mixed textiles to be recycled are entirely or partially used as starting materials, whose material composition strongly varies for different charges, for each paper material, an individual fingerprint of the starting materials and the manufacturing method in form of a data set may be stored. In particular, a textile may be a processed fiber product. A mixed textile may correspondingly be denoted as inhomogenous fiber product. If, at a later point in time, the originality of a certain test product shall be tested, the same parameters may be metrologically detected again and a best compliance (for example in terms of a best-match-method) between the detected parameter values of the test product and one of the stored data sets may be searched. Thus, in a data set which is assigned to a certain paper material, the product identity is encoded. By the fact that, according to an exemplary embodiment, a plurality of constituents are received in the corresponding data set, the probability for a false match (i.e. a product is assigned to a wrong data set by mistake) may be strongly reduced. Furthermore, it is enabled in an efficient and robust manner, to distinguish paper material/paper products which were manufactured from used textiles from paper material/paper products which were manufactured from wood and/or paper.

It is especially advantageous to store a combination of multiple intrinsic non-cellulosic constituents of a paper material which is manufactured from recycled used textiles as fingerprint (data set) in a database and to compare it with a test product, if necessary. In particular, in this context, an intrinsic constituent may denote a constituent of the paper material which is mandatorily contained in the final paper material as a result of the used starting material (preferably used textiles) and a used manufacturing method without an additional measure. Thereby, the data set is generatable virtually without additional effort, since the constituent which is used as marker does not have to be mandatorily separately added to the paper material, and may nevertheless be specifically indicative for a certain paper material (since in case of used textiles, inhomogenous mixed textiles may be assumed). By the fact that not, or at least not only, the cellulose itself is used as analyzed constituents, but at least also non-cellulosic foreign matters which originate from the used textiles, an especially specific and/or individual data set for a certain paper material may be stored and compared with test products. In this way, it is possible to ensure a reliable quality of paper materials, by the ability to verify the origin from a recycling method and to reliably identify counterfeits or plagiarism.

According to an exemplary embodiment, the paper material is manufactured on basis of used clothes as cellulose source as at least a part of a starting material; and/or the paper material is manufactured on basis of remains from a clothing manufacture as cellulose source as at least a part of a starting material. This has the advantage, that both a certain charge of the clothes production and a certain used clothes mixture may be reliably identified.

According to an exemplary embodiment, the intrinsic non-cellulosic constituents comprise at least one of a group, which is consisting of a trace element, in particular a metal, further in particular a rare earth metal, a metal oxide, in particular titanium dioxide and/or zinc oxide, a colorant, a luminescent, and a synthetic plastic, in particular elastane and/or polyester.

In an embodiment, the different non-cellulosic foreign matters amounts of the used textiles and/or the cellulose intermediate products which result therefrom, are used for encoding an information, such as origin, charge, composition, proof of originality, etc. In particular by mixing different such pulp intermediate products, a plurality of different codes may be represented.

In the following, exemplary embodiments of the present invention are described in detail with reference to the following FIGURE.

FIG. 1 shows a flow diagram of a method for manufacturing a cellulosic paper material from used textiles according to an exemplary embodiment of the invention.

Before exemplary embodiments are described with reference to the FIGURE, some basic considerations shall be summarized, based on which exemplary embodiments of the invention have been derived.

According to an exemplary embodiment, by suitable process stages in the context of the manufacturing process, the properties of the treated starting material and thus of the paper which is manufactured by such a pulp, are influenced as follows: i) a short boiling duration in NaOH leads to a significant conservation of the chain length in the resulting pulp, ii) discharging a too short chain length from the production process, iii) reduction of metal oxides from used textiles (binding, filtering, etc.), iv) reduction of synthetic fibers (polymers) by a selection of the used textiles (and/or the raw recyclate), v) controlling the boiling duration, boiling temperature, etc. Thereby it is achieved, that per polymer fiber type <5% portions are present in the resulting pulp, vi) removing by reaction and converting or removing metal oxides and/or synthetic polymers by adding oxygen in the boiling process, and vii) by controlling explicit process parameters (e.g. exposition duration), the resulting average chain length may be maximized.

According to an exemplary embodiment, in the manufacture of both cellulose variants in the same production environment, different advantages are possible: i) simplifying pre-productive stages, thus no rejection/storage of too good or too poor raw recyclates, but only an assignment in the corresponding production process, ii) mixing the resulting cellulose to a certain quality in the post-productive context, iii) controlling the produced cellulose quality by influencing single process stages.

According to an exemplary embodiment, the following advantageous features are not known yet: i) that the foreign matters which origin from recyclates (such as used textiles) are changed and/or utilized in theft concentration, ii) that in the treatment of recyclates, special measures for achieving certain chain lengths are performed, iii) that the recycling capability/frequency of paper (-like) planar products is increased by a partial use of used textiles raw recyclate in the pulp, iv) the use of the thermally induced binding capability of polymers which are contained in the pulp of the raw recyclate, as binding agent reducer in the paper industry, v) the combination of long-chain cellulose from cotton and an amount of polymer fibers which both are constituents of the raw recyclate, for an increase of the recycling capability/frequency of paper (-like) planar products, and vi) paper manufacture with a pulp amount from textile recycling which still contains a residual content of polymers, in particular PUR (elastane) and titanium dioxide (matting agent).

According to an exemplary embodiment, in the paper industry; it is permanently searched for de-inking methods with possibly low additional aggressive chemicals. This so-called de-inking is implicitly achieved in the method according to embodiments of the invention. By boiling, in particular a hot boiling with additional oxygen, the textile colorant residual constituents are dissolved to such an extent, that it acts like a de-inking method as well. However, this special de-inking is performed without additional chemical or physical measures, since the used chemicals and processes are already mandatorily required for the disintegration of the used textiles to be recycled. Furthermore, in the paper industry, de-inking methods are based on sorting and flotation for removing printing color. These processes are also applied as standard in the standard process of the pretreatment of used textiles for recovering pulp. When mixing a such manufactured cellulose with cellulose from the paper recycling at corresponding boundary conditions, this leads to an additionally whiter pulp mixture and thus to a whiter paper, which additionally reduces the subsequent bleaching stages.

According to an exemplary embodiment, the following mechanisms of action may be relevant:
a) this pulp connects both modes of action in an exemplary manner:
absorption: by fiber structure, fibrillation, pore structure;
adsorption: a1) for aqueous contamination (acids, alkalis, dispersions, aqueous binding agents) by the high content of hydroxyl groups (hydrophilic properties),
a2) for a lipid-contamination (oils, fats, mineral oil products, solvents, lacquers, fuels) by the residual content of polyurethane, polyimide, and other polymers (hydrophobic properties);
b) in particular the content of elastane combines modes of action in one molecule and significantly improves the water/oil binding capacity;
c) simple mechanical removability from the location of application (street . . . );
d) the natural textile origin ensures a problem-free rotting on dumps;
e) burning is possible without residues. No dangerous substances in the smoke gas;
f) present (hardly avoidable) $TiO_2$—contents, usually in a very fine dispersion, in combination with UV-light (free application) act as an oxidizing catalyzer for a degradation of organic contaminations which contain —OH, —O, COOR, —C=C—, groups: these are: oils, fats, solvents, salves; glycols (antifreeze agents), biodiesel: this may lead to advantages, in particular at a low contamination load.

DETAILED DESCRIPTION OF EXEMPLARY EMBODIMENTS

FIG. 1 shows an exemplary embodiment of a method 100 for manufacturing a cellulosic paper material 150. At first, a mixture of used textiles is provided (see block 105) as starting material 101. The used textile mixture encompasses remains from a clothing manufacture and used clothes and comprises cellulose (fibers) and non-cellulosic foreign matters. The non-cellulosic foreign matters are synthetic fibers (plastics) and metal oxides. The synthetic fibers comprise PUR, in particular elastane, polyester (e.g. PET), polyamide. The metal oxides comprise pigments, such as titanium dioxide and zinc oxide. The stage of providing encompasses comminuting the used textiles. Providing 105 encompasses mechanically comminuting the starting material 101 by shredding. Thereby, mainly large non-cellulosic disturbing matters may be removed from the starting material 101, for example buttons, seams, and prints of the used clothes which are at least partially used for generating the starting material 101. By mechanically comminuting, the starting material 101 may be separated into single fibers, for example. It is to be considered that the described mechanically comminuting according to a further embodiment may also be performed during the depleting process, in particular prior to depleting.

It is also possible (see block 160) to use the cellulose-comprising starting material 101 commonly with other cellulose-comprising materials as further starting material 111 for the subsequent treatment. Thus, the starting material 101 may be mixed with the further starting material 111, which comprises cellulose and/or at least one synthetic plastic. The supplied further starting material 111 comprises a composition which is different from the composition in the starting material 101. The generation of the paper material 150 may now be performed based on the starting material 101 and the further starting material 111, so that the paper material 150 contains a predetermined composition (e.g. an amount of synthetic plastic). Alternatively or additionally, the further starting material 111 may also comprise remains from a clothing manufacture, for example. In FIG. 1, the further starting material 111 is supplied to the depleting process 120, in particular the boiling process 121, in a treated form. According to a further exemplary embodiment, the further starting material 111 may also be supplied prior to the depleting process 120 (in particular substantially at the same time with supplying the starting material 101) or even after the depleting process 120.

The mentioned depleting process 120 encompasses at least partially depleting 120 the non-cellulosic foreign matters from the cellulose; to provide a depleted starting material 110. Depleting 120 encompasses performing a mechanical separation 121 and a chemical separation 122.

Mechanically separating 121 encompasses a density separation, in particular by a flotation method, to selectively deplete e.g. polyester from the cellulose. Fiber constituents may be suspended in a liquid (aqueous) medium. Separating the non-cellulosic fibers from the cellulosic fibers is performed due to different physical properties in the liquid medium, in particular different gravitational, centrifugal force-related, floating and/or electrostatic properties. Besides the separation of cellulose and non-cellulosic foreign matters, also cellulose fractions with different chain lengths may be separated in this way.

Chemically separating 121 comprises a boiling process (discontinuous or continuous) in a boiling device (e.g. a pressure vessel and/or digester). An alkaline boiling solution is used which comprises sodium hydroxide (in the range of 1 to 35% (w/w). The pH value is in the range 7 to 14. The boiling process is performed at a temperature in the range of 90 to 185° C. and a pressure in the range 1 to 21 bar for 45 to 270 minutes. Additionally, the boiling solution contains a cellulose-stabilizing agent, such as a magnesium salt, to counteract against an undesired degradation. At the elevated pressure, the starting material 101 is boiled in the alkaline, to deplete undesired constituents (e.g. colorants, equipments, usage contamination from biological sources). Furthermore, in this way, also synthetic fibers and metal oxides are depleted. Advantageously, the boiling process 121 may encompass supplying an oxidizing agent, e.g. oxygen. This may be performed alternatively or additionally to a bleaching. Furthermore, the metal oxides may be chemically reduced with advantage.

In an exemplary embodiment, depleting the synthetic fibers (see block 125) encompasses substantially completely depleting the synthetic fibers from the cellulose. In this way, highly pure cellulose fibers are provided as depleted starting material 110.

In another embodiment, predefined synthetic fibers are selectively depleted, while other predefined synthetic fibers remain in the depleted starting material 110. Plastics, such as polyamides and certain polyesters are at least partially (in particular as completely as possible) depleted, while polyester and/or elastane are (at least partially) retained. Polyester may act as adhesion promoter in the paper material to be manufactured, while elastane may increase the oil binding capability. Thus, partially selectively depleting 125 the non-cellulosic foreign matters from the cellulose is performed, such that predefined synthetic fibers at least partially remain in the depleted starting material 110, which cause predefined properties in the paper material 150. The process parameters (amongst others temperature, pressure, residence time, boiling solution, mixing, composition) of the depleting process 120 are controlled, such that the desired properties are obtained in the final product.

In an embodiment, the process parameters of the purifying process 120 are controlled, such that the average chain length of the cellulose in the treated starting material 110 is within a determined predefined range. A selectively depleting (see block 127) of cellulose (fibers) is performed, whose average chain length is below a predefined value, e.g. 300 glucose units, preferably in the range 20 to 150 glucose units. This may be achieved by mechanically separating, in particular density separation, for example.

In an embodiment, the process parameters are adjusted such that selectively depleting (see block 126) the non-cellulosic foreign matters from the cellulose is performed such that intrinsic foreign matters remain in the depleted starting material 110. These intrinsic non-cellulose foreign matters are metal oxides, such as titanium oxide or zinc oxide, which are used in the textiles as pigments.

From the depleted starting material 110, after the treatment process 120, a cellulosic paper material 150 is formed (see stage 170). The depleted starting material 110 may at first undergo multiple cleaning stages 130, 135. Such an optional cleaning may comprise at least partially removing (residual) colorants by bleaching (see block 130), for example. Thereby, it is possible to entirely or partially discolor the starting material 110, for example to manufacture white or grey paper materials 150. Furthermore, the purified starting material 110 is subjected to a cleaning stage 135, which is an aqueous cleaning or a chemical cleaning. In the latter case, organic solvents are used, such as ethanol or tensides.

The processed treated starting material 110 is now present as an aqueous cellulose suspension. It is subsequently supplied to a pulp 145 (see stage 140). Alternatively, the processed treated pulp 110 is provided with a binder and constitutes a pulp 145 itself. The pulp 145 comprises water, cellulose, and the binder. Additionally, the pulp comprises functionalized residual constituents of the used textiles, depending on the treatment process 120. These are e.g. elastane for an adhesion improvement or titanium dioxide as encoding agent. The pulp 145 is subsequently dried, so that forming the cellulosic paper material 150 from the pulp 145 is enabled. After drying, the paper material 150 is present as paper or as pre-product for the manufacture of paper or paper like materials (cardboard, filter . . . ).

Supplementary, it is to be noted that "comprising" does not exclude other elements or steps and "a" or "an" does not exclude a plurality. Furthermore, it is noted, that features or steps which are described with reference to one of the above embodiments may also be used in combination with other features or steps of other above described embodiments. Reference signs in the claims are not to be construed as limitation.

The invention claimed is:

1. A method for manufacturing a cellulosic paper material, wherein the method comprises:
   providing used textiles as a starting material, wherein the used textiles comprise at least one of residues from a clothing manufacture or used clothes,
   wherein the used textiles comprise cellulose and non-cellulosic foreign matters;
   wherein the non-cellulosic foreign matters comprise at least one of synthetic plastic or metal oxide;
   partially depleting the non-cellulosic foreign matters from the cellulose, to provide a depleted starting material;

forming the cellulosic paper material from the partially depleted starting material; and further comprising at least one of the following features:

wherein the partially depleting the non-cellulosic foreign matters from the cellulose is such that intrinsic foreign matters at least partially remain in the depleted starting material; or substantially completely depleting the non-cellulosic foreign matters from the cellulose such that highly pure cellulose fibers are provided as depleted starting material.

2. The method according to claim 1, wherein depleting further comprises:

mechanically separating at least a part of the non-cellulosic foreign matters; or chemically separating at least a part of the non-cellulosic foreign matters.

3. The method according to claim 2, wherein chemically separating further comprises:

performing a boiling process, wherein the boiling process is performed such that the average degree of polymerization of the cellulose of the depleted starting material is within a predefined range.

4. The method according to claim 3, wherein depleting further comprises: supplying an oxidizing agent to the boiling process; or chemically reducing at least a part of the starting material.

5. The method according to claim 1, wherein depleting further comprises:

controlling the process parameters, such that an average degree of polymerization of the cellulose of the depleted starting material is substantially in a predefined range, wherein the cellulose of the depleted starting material comprises the average degree of polymerization of 300 monomers or more.

6. The method according to claim 1, wherein depleting further comprises:

selectively depleting cellulose whose average degree of polymerization deviates from a predefined range.

7. The method according to claim 1, further comprising: mixing the depleted starting material with a further starting material for obtaining a mixed starting material.

8. The method according to claim 1, further comprising:

selectively depleting the non-cellulosic foreign matters from the cellulose, such that at least one predefined synthetic plastic at least partially remains in the depleted starting material;

wherein the predefined synthetic plastic which at least partially remains in the depleted starting material comprises PUR.

9. The method according to claim 1, wherein depleting further comprises:

selectively retaining metal oxides such that they may act as oxidation catalysts for organic contaminations.

10. The method according to claim 1, further comprising:

supplying the depleted starting material to a pulp, and forming the cellulosic paper material from the pulp.

11. The method according to claim 6, wherein selectively depleting cellulose whose average degree of polymerization deviates from a predefined range by intentionally removing cellulose with a short chain length.

12. The method of claim 8 wherein by selectively depleting the present residual plastics, a desired amount of the plastics is adjusted.

13. The method according to claim 7, wherein the mixing the depleted starting material with a further starting material of a different composition comprising different plastics for obtaining a mixed starting material is such that a desired amount of the different plastics results.

14. The method according to claim 8, wherein the predefined synthetic plastic which at least partially remains in the depleted starting material comprises elastane.

15. The method according to claim 9, wherein the metal oxides are titanium dioxide.

16. The method according to claim 9, wherein the metal oxides are pigments.

17. A method for manufacturing a cellulosic paper material, wherein the method comprises:

providing used textiles as a starting material, wherein the used textiles comprise at least one of residues from a clothing manufacture or used clothes, wherein the used textiles comprise cellulose and non-cellulosic foreign matters;

wherein the non-cellulosic foreign matters comprise synthetic plastic;

partially depleting the non-cellulosic foreign matters from the cellulose, to provide a depleted starting material;

mixing the depleted starting material with a further starting material of a different composition comprising different plastics for obtaining a mixed starting material such that a desired amount of the different plastics results;

forming the cellulosic paper material from the partially depleted starting material; and further comprising at least one of the following features:

wherein the partially depleting the non-cellulosic foreign matters from the cellulose is such that intrinsic foreign matters at least partially remain in the depleted starting material; or substantially completely depleting the non-cellulosic foreign matters from the cellulose such that highly pure cellulose fibers are provided as depleted starting material.

18. A method for manufacturing a cellulosic paper material, wherein the method comprises:

providing used textiles as a starting material, wherein the used textiles comprise at least one of residues from a clothing manufacture or used clothes, wherein the used textiles comprise cellulose and non-cellulosic foreign matters;

wherein the non-cellulosic foreign matters comprise metal oxide;

wherein the metal oxides are titanium dioxide and/or pigments;

partially depleting the non-cellulosic foreign matters from the cellulose, to provide a depleted starting material;

forming the cellulosic paper material from the partially depleted starting material; and further comprising at least one of the following features:

wherein the partially depleting the non-cellulosic foreign matters from the cellulose is such that intrinsic foreign matters at least partially remain in the depleted starting material; or substantially completely depleting the non-cellulosic foreign matters from the cellulose such that highly pure cellulose fibers are provided as depleted starting material.

* * * * *